United States Patent [19]

Tullio

[11] 3,963,418

[45] June 15, 1976

[54] YELLOW DISAZO ACID DYE SOLUTION

[75] Inventor: Victor Tullio, Wilmington, Del.

[73] Assignee: E. I. Du pont de Nemours and Company, Wilmington, Del.

[22] Filed: Aug. 1, 1974

[21] Appl. No.: 493,972

[52] U.S. Cl. .................... 8/41 B; 8/41 R; 8/41 A; 8/41 C; 8/41 D; 8/82; 8/85 B; 8/87; 8/172 A; 260/186
[51] Int. Cl.² ............... C09B 31/06; D06P 1/39; C09B 31/08
[58] Field of Search ................ 8/41 R, 41 A, 41 B, 8/41 C, 41 D, 87, 172, 85, 82; 260/186

[56] References Cited
UNITED STATES PATENTS

| | | | |
|---|---|---|---|
| 2,989,360 | 6/1961 | Mautner | 8/55 |
| 3,281,201 | 6/1966 | Mautner | 8/93 X |
| 3,600,376 | 8/1971 | Franklin | 260/175 |
| 3,681,320 | 8/1972 | Franklin | 260/175 |

OTHER PUBLICATIONS

Zussman, H. W., American Dyestuff Reporter, June 27, 1949, pp. 500–504.
Summersgill, J. V., J. Soc. Dyers & Col. 70(7), July 1954, pp. 278–283.

*Primary Examiner*—Christopher A. Henderson, Jr.
*Attorney, Agent, or Firm*—James A. Costello; Robert E. Patridge

[57] ABSTRACT

A hard water-tolerant, storage stable dye solution which comprises a. about 10 to 25 percent of a dye of the formula

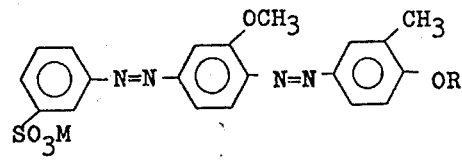

wherein M is a solubilizing cation and R is
—CH$_2$CH$_2$OH, —CH$_2$CH(CH$_3$)OH or —CH$_2$CH(C$_2$H$_5$)OH, b. about 5 to 25 percent of N-methyl-2-pyrrolidone,
c. about 0.02 to 0.3 part of ethylenediaminetetraacetic acid anion per part of said dye,
d. lithium and/or akanolammonium cations in an amount sufficient to provide a pH of about 6.5 to 12, and
e. at least about 50 percent water.

7 Claims, No Drawings

YELLOW DISAZO ACID DYE SOLUTION

BACKGROUND OF THE INVENTION

1. Field of the Invention

This invention relates to storage stable, concentrated monosulfonated disazo dye solutions which retain good solubility in hard water.

2. Description of the Prior Art

The use of direct, acid and basic dyes as concentrated aqueous solutions, often referred to in the art as liquid dyes, has become commercially important in the last few years for continuous dyeing of paper and textile goods. The chief advantages of such liquid dyes over dye powders are the avoidance of dusting problems in handling and the great ease and speed of metering the liquid dyes.

The sodium salts of monosulfonated disazo dyes generally have limited solubility in cold water; their solubility is seldom more than 1 weight percent. With the advent of solution dyes for continuous dyeing processes, various methods have been disclosed for preparing 10% to 20% solutions of these dyes for use in said processes. In many cases, lithium salts of the dyes have been found to be more soluble than the more conventional sodium salts. Also alkanolammonium salts have been found to offer improved solubility and other desirable properties, as disclosed in U.S. Pat. No. 2,314,356 and U.S. Pat. No. 3,681,320. In most cases, the aqueous solutions employ a supplementary solvent which is a water-miscible solvent of fairly low molecular weight. Ethylene glycol, glycerin, Cellosolve, Carbitol, and other solvents of this type have been used.

In a copending application of Steven Dombchik, Ser. No. 284,478, filed Aug. 29, 1972, is disclosed a storage-stable, concentrated, aqueous disazo acid dye solution consisting essentially of, on a weight basis, a. 10–25% of the lithium or tri(2-hydroxyethyl) ammonium salt of the dye having the formula

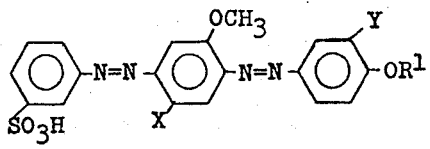

wherein one of X and Y is hydrogen and the other is $CH_3$ and $R^1$ is $-CH_2CH_2OH$, $-CH_2CH(CH_3)OH$ or $CH_2CH(C_2H_5)OH$;

b. 5–25% of N-methyl-2-pyrrolidone; and c. the balance, to 100%, water.

Although these dye solutions are storage-stable, they tend to precipitate calcium and/or magnesium salt forms of the dyes when water containing these ions is added to the dye solution.

It is known to immobilize multivalent ions such as $Ca^{++}$, $Mg^{++}$ and $Fe^{+++}$ by complexing them with the sodium salt of ethylenediametetraacetic acid. For example, U.S. Pat. No. 3,055,726 discloses the use of the sodium salt of ethylenediaminetetraacetic acid and a polymeric alkali metal phosphate in a dye bath containing hard water and sodium carbonate. Summersgill, Journal of the Society of Dyers and Colourists, vol. 70, p. 278–283 (1953), discloses that some recalcitrant wool dyes such as Polar Red RD (CI 23635), a disulfonated azo dye, can be prevented from precipitating in hard water by adding the sodium salt of ethylenediaminetetraacetic acid (see page 279, column 1, lines 17–23).

SUMMARY OF THE INVENTION

In accordance with this invention hard water-tolerant, storage stable, concentrated, aqueous monosulfonated disazo dye solutions have been discovered which comprise, by weight, a. about 10 to 25 percent of a monosulfonated disazo dye of the formula

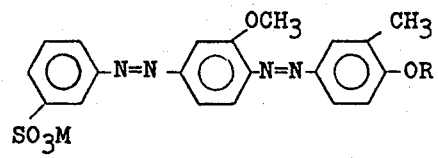

wherein R is $-CH_2CH_2OH$, $-CH_2CH(CH_3)OH$, or $-CH_2CH(C_2H_5)OH$, and M is lithium or

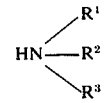

where $R^1$ and $R^2$ are $C_2-$ or $C_3-$alkanol radicals, and $R^3$ is H or a $C_2-$ or $C_3$-alkanol radical, b. about 5 to 25 percent of N-methyl-2-pyrrolidone, c. about 0.02 to 0.3 part of ethylenediaminetetraacetic acid anion per part of said dye, d. cations selected from the group consisting of lithium and alkanolammonium of the formula

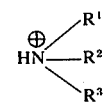

in an amount sufficient to provide a pH of about 6.5 to 12, and e. at least about 50 percent water.

DETAILED DESCRIPTION OF THE INVENTION

In the use of liquid dyes containing a monosulfonated disazo dye, such as in carpet dyeing operations, it is occasionally necessary to wash out the dye equipment and change the dye color. This is done by flushing large amounts of water through the equipment. When hard water containing calcium and/or magnesium ions is used, large amounts of dye are precipitated and pipes may become clogged. When the sodium salt of ethylenediaminetetraacetic acid is added to the dye solution to chelate these metal ions, a storage stability problem is encountered, in that on standing for a few hours the dye begins to precipitate. Precipitation of the dye from these solutions is further accelerated by reducing the temperature. It has been discovered in accordance with this invention that when ethylenediaminetetraacetic acid is added as the free acid to monosulfonated disazo dye solutions in which the dye is in the lithium and/or the alkanolammonium salt form and sufficient additional lithium and/or alkanolammonium cations are present to provide a pH of about 6.5 to 12, the effects of hard water are overcome and the solution is storage stable.

The monosulfonated disazo dyes employed in the aqueous solutions (liquid dyes) of this invention are readily prepared employing known diazotization and coupling techniques. These dyes can be prepared by diazotizing metanilic acid, coupling the diazonium salt to anilinomethanesulfonic acid, then hydrolyzing off the methanesulfonic acid group to produce a monoazo compound, which is diazotized and coupled to o-cresol to produce a disazo compound, which is reacted under alkaline conditions with ethylene-, propylene-or butylene oxide. The dye can be produced as either the lithium or the alkanolammonium salt employing conventional procedures. The dye solutions of this invention contain about 10 to 25 percent by weight, and preferably about 12 to 20 percent of dye. Throughout the specification and claims the amounts of dye are calculated as the free acid.

The liquid dyes of this invention contain at least about 5 weight percent of N-methyl-2-pyrrolidone (NMP) and at least about 50 weight percent of water. Although there is no functional upper limit on the amount of NMP that can be used, commercially useful liquid dyes can be produced by employing NMP in amounts up to about 25 weight percent of the liquid dye. Greater amounts of NMP add to the cost of the liquid dye and to the problems of eliminating or recycling the NMP. Preferably, the liquid dye contains about 10 to 20 weight percent of NMP.

The liquid dyes are best obtained by preparing the dye in aqueous NMP. Alternatively, the dye can be prepared in an aqueous medium and the desired amount of NMP can be added after dye formation is complete. As a further alternative, although not often done, the dye can be prepared and isolated and then dissolved in aqueous NMP.

Ethylenediaminetetraacetic acid (EDTA), for convenience in free acid form, is added to the liquid dye in the amount of about 0.02 to 0.3 part per part of the dye. The commercially available sodium salt form of EDTA should not be used since it does not provide satisfactorily stable solutions. All, or nearly all, of the cations in the solution should be limited to lithium or alkanolamonium ions. The pH of the solution is preferably kept in the range of about 7 to 11 by adding a lithium base or triethanolamine, optionally partially substituted for by diethanolamine, diisopropanolamine or a similar alkanolamine. Preferably, the EDTA anion is present in the amount of about 0.05 to 0.2 part, calculated as free acid, per part of dye.

The lithium salt form of the dye can be obtained by reacting the dye with either lithium hydroxide (usually available as lithium hydroxide monohydrate) or lithium carbonate. The lithium compound should be present in an amount sufficient to neutralize the sulfonic acid group of the dye and the carboxylic acid groups of the EDTA, giving a pH of about 6.5 to 12 and preferably about 7 to 11.

If another acidic material is made a part of the dye solution, enough lithium compound should be added to neutralize it also. Sodium cations are particularly objectionable in these solutions, as solutions containing them are less stable.

The alkanolammonium salt form of the dye is obtained by reacting the dye with an alkanolamine in which the alkyl groups contain 2 to 3 carbon atoms. The preferred alkanolamine is triethanolamine. Improved solubility is sometimes seen when a different alkanolamine replaces part of the triethanolamine. Diethanolamine and diisopropanolamine are representative of such alternative alkanolamines.

In routine production of the dye solutions of the invention, the mixed solvent is first prepared by mixing the components, and then the dye is added. If the dye is added as a water-wet filter cake, care must be taken to allow for the water present in the cake. The sodium chloride content of the dye in either dry or wet form should be less than 1%. After thorough mixing, the alkanolamine or lithium base is added followed by the ethylenediaminetetraacetic acid. The pH is adjusted by adding the base and, after ½ hour of stirring, the pH is determined again and readjusted if necessary. The charge is heated to about 80°–90°C for several hours, then cooled to room temperature. It is then standardized to the required strength by adding more of the supplementary solvent as necessary to meet the strength of the selected standard.

Commercial liquid dyes must be stable to dilution with hard water, and a test has been devised to simulate a dye-print bath and test its tolerance to dilution with hard water. In this test, so called "Dalton hard water" is used. The water, which contains 85 parts per million (ppm) of $CaCl_2$ and 15 ppm of $MgSO_4$, simulates the water of Dalton, Georgia, a city which is a center of the carpet industry in the United States. The test also simulates a typical dye-print bath by including "Polygum" 260, a widely used print paste thickener which is a purified natural gum ether derived from locust beans. To test the characteristics or dye solutions, 1 part of the liquid dye solution and 0.2 part of "Polygum" 260 is added to 98.8 parts of Dalton hard water and the mixture is stirred. Solutions made from the liquid dye solutions of this invention remain clear with no precipitate.

The liquid dyes of this invention have excellent storage stability, suffering no strength loss on prolonged storage for several months and undergoing no dye precipitation after six months of storage at 0°C. They are particularly useful for coloring nylon and they can be used in any of the batch or continuous dyeing or printing procedures presently known and used in the trade.

EXAMPLE OF THE INVENTION

The following example, illustrating the best mode contemplated for carrying out the invention, is given without any intention that the invention be limited thereto. All parts and percentages are by weight.

Preparation of the Dye

In a suitable vessel 33 parts of m-(4-amino-3-methoxyphenylazo)benzenesulfonic acid in the form of a water wet filter cake was slurried in 50 parts of water with 24.3 parts of 30% hydrochloric acid and 0.03 part of a nonionic surfactant which is an ethylene oxide additive of a mixture of mono and dialkyl phosphates. At 25°C. there was added 22.5 parts of 31.5% aqueous sodium nitrite solution gradually over about ½ hour. After reacting the residual nitrite with sulfamic acid, the diazo product was isolated by filtration and washed with water to remove most of the residual hydrochloric acid. The filter cake was slurried in 50 parts of water, and the slurry added gradually over a two-hour period to the coupler solution maintained at 16° to 20°C. The coupler solution was prepared by mixing 11.9 parts of ortho-cresol and 4.6 parts of lithium hydroxide monohydrate in 50 parts of water. After addition to the coupler solution was complete, the charge was stirred at about 20°C for an hour. It was then diluted with water to 17.5% active ingredient, yielding 223 parts of solution to be used in the next step.

The solution obtained above was adjusted to a pH of about 9.5 by adding a small amount of lithium hydroxide monohydrate. There was then added 20 parts of 1,2-epoxybutane, and the mass was heated to reflux, which started at 68°C. After 5 hours at reflux the charge was cooled to room temperature. The dye formed was

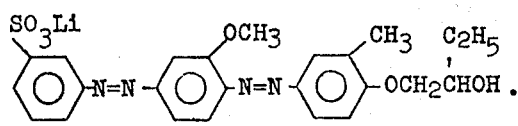

Preparation of the Dye Solution

To the above reaction mass there was added 30.5 parts of N-methylpyrrolidone, 10.45 parts of ethylenediaminetetraacetic acid and 5.2 parts of lithium hydroxide monohydrate to adjust pH of the solution to about 8.5. Water was added to bring the active ingredient dye content to 16.3%. The yield was quantitative over the butoxylation and solution steps. The dye liquid showed no precipitation on standing 24 hours at 0°C.

When the sodium salt form of EDTA was substituted for the free acid form, a precipitate developed on standing at 0°C., and was found to show precipitate even at 60°C. when held overnight.

Tolerance to hard water was tested as follows: A 2% stock solution of "Polygum" 260 (Polymer Industries, Inc., Springdale, Conn.) was first prepared in both Dalton hard water and in deionized pure water. The "Polygum" was sprinkled into each type of water while stirring with a high speed mixer and stirred for 15 minutes, then allowed to stand 4 hours before use. Fifty grams of the "Polygum" 260 solution was placed in each of two 500-ml. beakers. The content of each beaker is diluted to 300-ml. volume, one with hard water and the other with deionized water.

To each of two 200-ml. beakers was added 150 ml. of water, one hard water and the other deionized water. Five grams of the liquid dye was added to each beaker of water. Each dye solution was then added to the corresponding (same water) gum solution, making a final volume of 500 ml. in each beaker. The pH of each was tested and adjusted to 5.5 if necessary, using either acetic acid or trisodium phosphate. The solutions were graded after 4 hours and again after 24 hours. They were graded visually on a scale of 5, 4, 3, 2 and 1, with 5 representing perfectly clear, 4 representing slight dispersion, 3 representing noticeable precipitation or flocculation, and 1 representing much precipitation or flocculation. The dye solution gave a grade of 5–4, in both hard water and deionized water, even after standing 24 hours.

The dye solution gave bright reddish-yellow shades on textiles, and was particularly useful for dyeing nylon carpets.

Although the invention has been described and exemplified by way of a specific embodiment, it is not intended that it be limited thereto. As will be apparent to those skilled in the art, numerous modifications and variations of these embodiments can be made without departing from the spirit of the invention or the scope of the following claims.

I claim:
1. A hard water-tolerant, storage stable, concentrated, aqueous monosulfonated disazo dye solution which comprises, by weight,
   a. 10 to 25 percent of a monosulfonated disazo dye of the formula

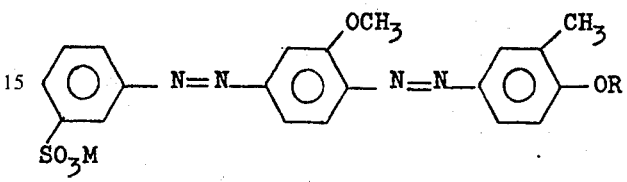

where R is $CH_2CH(C_2H_5)OH$, and M is lithium or

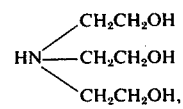

b. 5 to 25 percent of N-methyl-2-pyrrolidone,
   c. 0.02 to 0.3 part of ethylenediaminetetraacetic acid anion per part of said dye,
   d. cations selected from the group consisting of lithium and alkanolammonium of the formula

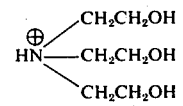

in an amount sufficient to provide a pH of 6.5 to 12, and
   e. at least 50 percent water.
2. The dye solution of claim 1 in which the dye is present in the amount of 12 to 20 percent.
3. The dye solution of claim 2 in which the N-methyl-2-pyrrolidone is present in the amount of 10 to 20 percent.
4. The dye solution of claim 3 in which the ethylenediaminetetraacetic acid anion is present in the amount of 0.05 to 0.2 part per part of said dye.
5. The dye solution of claim 4 in which the pH is 7 to 11.
6. The dye solution of claim 5 in which the cation is lithium.
7. The dye solution of claim 6 in which the dye is of the formula

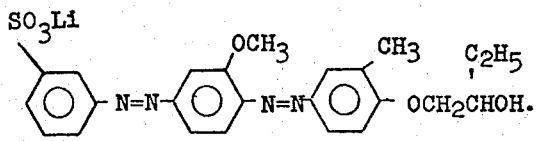

* * * * *